United States Patent
Molaro et al.

(10) Patent No.: US 7,106,381 B2
(45) Date of Patent: Sep. 12, 2006

(54) POSITION AND TIME SENSITIVE CLOSED CAPTIONING

(75) Inventors: Donald Molaro, Sunnyvale, CA (US); Ted M. Dunn, Los Gatos, CA (US)

(73) Assignees: Sony Corporation, Tokyo (JP); Sony Electronics Inc., San Diego, CA (US)

( * ) Notice: Subject to any disclaimer, the term of this patent is extended or adjusted under 35 U.S.C. 154(b) by 606 days.

(21) Appl. No.: 10/396,766

(22) Filed: Mar. 24, 2003

(65) Prior Publication Data

US 2004/0189868 A1 Sep. 30, 2004

(51) Int. Cl.
*H04N 5/278* (2006.01)
*H04N 9/74* (2006.01)
*H04N 9/76* (2006.01)

(52) U.S. Cl. .................. 348/468; 348/589; 348/600

(58) Field of Classification Search ............. 348/589, 348/600, 468, 563, 564, 569; 725/37, 40, 725/43, 137; H04N 9/74, 9/76, 5/445, 5/278
See application file for complete search history.

(56) References Cited

U.S. PATENT DOCUMENTS 5,477,274 A * 12/1995 Akiyoshi et al. ........... 348/468
5,572,260 A * 11/1996 Onishi et al. ............... 348/468
5,913,009 A * 6/1999 Kuboji et al. ............... 348/468
6,829,429 B1 * 12/2004 Kitahashi et al. ........... 348/468

OTHER PUBLICATIONS

Federal Communications Commission, Office of Engineering and Technology, "*Closed Captioning Requirements for Digital Television Receivers*", 24 pages.

* cited by examiner

Primary Examiner—Sherrie Hsia
(74) Attorney, Agent, or Firm—Haverstock & Owens LLP

(57) ABSTRACT

Closed captioning information is provided regarding the location of a speaker, and when the text is spoken. An audio/video signal includes a video data and the closed captioning information. The closed captioning information includes a time index, a closed captioning text, and positioning information. The positioning information indicates a position within a frame of the video data, and is associated with the closed captioning text for a given time index. The position corresponds to the speaker who is speaking the associated closed captioning text. A decoder device decodes the closed captioning information to determine the position of the speaker within the video data, and the time index to correlate the closed captioning text and positioning information to a specific frame of video data. The video data is preferably scaled to provide a less than full screen video. The scaled video is appropriately positioned on a display screen and talk bubbles, which provide a visual link between the closed captioning text and the speaker, are preferably displayed off the scaled video. Alternatively, the video is not scaled and the talk bubbles are superimposed on the full screen video in a blended fashion.

62 Claims, 3 Drawing Sheets

POSITION AND TIME SENSITIVE CLOSED CAPTIONING

FIELD OF THE INVENTION

The present invention relates to the field of closed captioning. More particularly, the present invention relates to the field of position and time sensitive closed captioning.

BACKGROUND OF THE INVENTION

Closed captions are a text version of the spoken part of a television, movie, or computer presentation. Closed captioning was developed to aid hearing-impaired people, but it is useful for a variety of situations. For example, captions can be read when audio can not be heard, either because of a noisy environment, such as an airport, or because of an environment that must be kept quiet, such as a hospital.

Closed captioning information is encoded within a video signal, in line 21 of the vertical blanking interval (VBI). The text only becomes visible with the use of a decoder, which may be built into a television set or available as a set top box. In general, an onscreen menu on newer televisions allows you to turn closed captioning on or off.

Most programs are captioned in advance of transmission, but the nature of some programs, such as live sports events, requires real time captioning. For real time captioning, a stenographer listens to the broadcast and types a shorthand version into a program that converts shorthand into captions and adds that data to the television signal.

The closed captioning standard is defined by the Electronic Industries Alliance in EIA-708-B, "Digital Television (DTV) Closed Captioning." EIA-708-B makes it possible for users to select the size, color, and font of their captions and to select among multiple streams, choosing, for example, a particular language.

The typical use of closed captioning is a text box directly overlaid on the video. This is not preferable since the text box blocks a portion of the video. Further, the closed captioning normally provides a visual transcription of the dialog. Often it is difficult to determine who was speaking, or in other words, to whom does the visual transcription in the closed captioning text box apply.

SUMMARY OF THE INVENTION

Embodiments of the present invention provide enhanced closed captioning functionality. Closed captioning information is provided regarding the location of a speaker, and when the text is spoken. An audio/video signal includes video data and the closed captioning information. The closed captioning information includes a time index, a closed captioning text, and positioning information. The positioning information indicates a position within a frame of the video data, and is associated with the closed captioning text for a given time index. The position corresponds to the speaker, or actor, who is speaking the associated closed captioning text. The decoder device decodes the closed captioning information to determine the position of the speaker within the video data, and the time index to correlate the closed captioning text and positioning information to a specific frame of video data. The video data is preferably scaled to provide a less than full screen video. The scaled video is appropriately positioned on a display screen and talk bubbles, which provide a visual link between the closed captioning text and the speaker, are preferably displayed off the scaled video. In an alternative embodiment, the video is not scaled and the talk bubbles are superimposed or overlaid on the full screen video in a blended fashion. Blending the talk bubbles is preferably performed using alpha blended graphics.

In one aspect of the present invention, a method of closed captioning includes receiving an audio/video signal including a video data and a closed captioning data, determining a position of a closed captioning text according to position information included within the closed captioning data, wherein the closed captioning text is associated to a speaker within the video data and the position of the closed captioning text is proximate the associated speaker, and displaying the video data on a display screen and displaying the closed captioning text on the display screen according to the determined position. The closed captioning text can overlay the displayed video data. The closed captioning text can be overlaid using alpha blended graphics. The method can also include rendering speaker-indicator graphics to provide a visual link between the closed captioning text displayed on the display screen and the associated speaker. The method can also include mixing the rendered speaker-indicator graphics and the scaled video data prior to display on the display screen. The closed captioning data can further include a timing index to associate the closed captioning text with a specific portion of the video data. The method can also include scaling the video data such that the scaled video data is smaller than the display screen on which the scaled video data is displayed. The position of the closed captioning text can be outside of the scaled video data. The position of the closed captioning text can partially overlay the scaled video data. The portion of the closed captioning text that overlays the scaled video data can be overlaid using alpha blended graphics. The method can also include positioning the scaled video data on the display screen. The closed captioning data can include speaker position information that associates the closed captioning text to a position of the associated speaker within the video data.

In another aspect of the present invention, a method of closed captioning includes receiving an audio/video signal including a video data and a closed captioning data, scaling the video data such that the scaled video data is smaller than a display screen on which the scaled video data is displayed, positioning a closed captioning text according to position information included within the closed captioning data, wherein the closed captioning text is associated to a speaker within the displayed scaled video data and the position of the closed captioning text is proximate the associated speaker. The position of the closed captioning text can be outside of the scaled video data. The position of the closed captioning text can partially overlay the scaled video data. The portion of the closed captioning text that overlays the scaled video data can be overlaid using alpha blended graphics. The method can also include positioning the scaled video data on the display screen. The method can also include rendering speaker-indicator graphics to provide a visual link between the closed captioning text displayed on the display screen and the associated speaker. The method can also include mixing the rendered speaker-indicator graphics and the scaled video data prior to display on the display screen. The closed captioning data can further include a timing index to associate the closed captioning text with a specific portion of the video data. The closed captioning data can include speaker position information that associates the closed captioning text to a position of the associated speaker within the video data.

In yet another aspect of the present invention, a device to provide closed captioning includes an input/output (I/O)

interface circuit to receive an audio/video signal, the audio/video signal including a video data and a closed captioning data, a display including a viewable area, and a processing circuit coupled to the display and to the I/O interface circuit to receive the audio/video signal from the I/O interface circuit, scale the video data such that the scaled video data is smaller than the viewable area, and position a closed captioning text according to position information included within the closed captioning data, wherein the scaled video data is displayed on a portion of the viewable area, thereby forming a displayed video data, the closed captioning text is associated to a speaker within the displayed video data and the position of the closed captioning text on the viewable area is proximate the associated speaker. The device can comprise an interactive television. The closed captioning data can include speaker position information that associates the closed captioning text to a position of the associated speaker within the video data. The device can also include a decoder to decode the received audio/video signal. The position of the closed captioning text can be outside of the scaled video data. The position of the closed captioning text can partially overlay the scaled video data. The portion of the closed captioning text that overlays the scaled video data can be overlaid using alpha blended graphics. The processor can render speaker-indicator graphics to provide a visual link between the closed captioning text displayed on the viewable area and the associated speaker. The processor can mix the rendered speaker-indicator graphics and the scaled video data prior to display on the viewable area. The closed captioning data can further include a timing index to associate the closed captioning text with a specific portion of the video data.

In still yet another aspect of the present invention, a television to provide closed captioning includes an input/output (I/O) interface circuit to receive an audio/video signal, the audio/video signal including a video data and a closed captioning data, a display including a viewable area, and a processing circuit coupled to the display and to the I/O interface circuit to receive the audio/video signal from the I/O interface circuit, scale the video data such that the scaled video data is smaller than the viewable area, and position a closed captioning text according to position information included within the closed captioning data, wherein the scaled video data is displayed on a portion of the viewable area, thereby forming a displayed video data, the closed captioning text is associated to a speaker within the displayed video data and the position of the closed captioning text on the viewable area is proximate the associated speaker. The television can comprise an interactive television. The closed captioning data can include speaker position information that associates the closed captioning text to a position of the associated speaker within the video data. The television can also include a decoder to decode the received audio/video signal. The position of the closed captioning text can be outside of the scaled video data. The position of the closed captioning text can partially overlay the scaled video data. The portion of the closed captioning text that overlays the scaled video data can be overlaid using alpha blended graphics. The processor can render speaker-indicator graphics to provide a visual link between the closed captioning text displayed on the viewable area and the associated speaker. The processor can mix the rendered speaker-indicator graphics and the scaled video data prior to display on the viewable area. The closed captioning data can further include a timing index to associate the closed captioning text with a specific portion of the video data.

In another aspect of the present invention, a network of devices to provide closed captioning includes a display device including a viewable area, and a decoder comprising an input/output (I/O) interface circuit to receive an audio/video signal, the audio/video signal including a video data and a closed captioning data, and a processing circuit coupled to the I/O interface circuit to receive the audio/video signal, scale the video data such that the scaled video data is smaller than the viewable area, and position a closed captioning text on the viewable area according to position information included within the closed captioning data, wherein the scaled video data is sent to the display device to be displayed on a portion of the viewable area, thereby forming a displayed video data, the closed captioning text is associated to a speaker within the displayed video data and the position of the closed captioning text on the viewable area is proximate the associated speaker. The display device can comprise an interactive television. The decoder can comprise a set top box. The closed captioning data can include speaker position information that associates the closed captioning text to a position of the associated speaker within the video data. The decoder can also include a decoder circuit to decode the received audio/video signal. The position of the closed captioning text can be outside of the scaled video data. The position of the closed captioning text can partially overlay the scaled video data. A portion of the closed captioning text that overlays the scaled video data can be overlaid using alpha blended graphics. The processor can render speaker-indicator graphics to provide a visual link between the closed captioning text displayed on the viewable area and the associated speaker. The processor can mix the rendered speaker-indicator graphics and the scaled video data prior to display on the viewable area. The closed captioning data can further include a timing index to associate the closed captioning text with a specific portion of the video data.

In yet another aspect of the present invention, a method of generating closed captioning including adding a closed captioning data to an audio/video signal, wherein the audio/video signal comprises a video data and the closed captioning data, and the closed captioning data includes a closed captioning text and position information that associates the closed captioning text to a position within the video data. The position within the video data can correspond to a speaker associated with the closed captioning text. The closed captioning data can further include a timing index to associate the closed captioning text with a specific portion of the video data.

In still yet another aspect of the present invention, a closed captioning stream of data comprising a video data and a closed captioning data, wherein the closed captioning data includes a closed captioning text and positioning information that associates the closed captioning text to a position within the video data. The position within the video data can corresponds to a speaker associated with the closed captioning text. The closed captioning data can further include a timing index to associate the closed captioning text with a specific portion of the video data.

DETAILED DESCRIPTION OF THE EMBODIMENTS

Embodiments of the present invention provide enhanced closed captioning information within an audio/video signal to a decoder device. The audio/video signal includes a video data and the closed captioning information. The closed captioning information includes a time index, a closed captioning text, and positioning information. The positioning information is associated with the closed captioning text for a given time index. The positioning information indicates a position within the video data. For example, a closed captioning text, caption 1, is associated to a position (100, 100) within a given frame of video data. The position (100, 100) correlates to an (x, y) coordinate system, as is well known in the art. Other means for conveying positioning information cam also be used.

The position corresponds to a speaker, or actor, who is speaking the associated closed captioning text. The decoder device decodes the closed captioning information to determine the position of the speaker within the video data, and the time index to correlate the closed captioning text and positioning information to a specific frame of video data. In conventional closed captioning, a text box is directly overlaid on the video and the contents of the text box normally provide only a transcription of the dialog.

In the present invention, the closed captioning information is enhanced to include information about the location of the speaker, and when the text is spoken. Using the location of the speaker in the video and the time index when the text is spoken, "talk bubbles" are added for the closed captioned video. The talk bubbles provide a visual link between the closed captioning text and the speaker. The video data is preferably scaled to provide a less than full screen video. The scaled video is appropriately positioned on a display screen and the talk bubbles are preferably displayed off the scaled video. An additional graphic can be superimposed on the video that further links the talk bubble to the speaker. Preferably, the additional graphic is a line, but any other graphic can be used which provides a visual link from the talk bubble to the speaker. In an alternative embodiment, the video is not scaled and the talk bubbles are superimposed on the full screen video in a blended fashion. Blending the talk bubbles is preferably performed using alpha blended graphics. In another alternative embodiment, the video is scaled and the talk bubbles are partially superimposed and blended on the video, with a remaining portion of the talk bubbles displayed off the video. Embodiments of the present invention differ from conventional implementations through the use of scaled video, the use of blended graphics to display the closed captioning, and the use of visual links between the speaker and the closed captioning text. Such an implementation minimizes the obstructions to the video and makes the dialog easier to follow.

Figure 1:
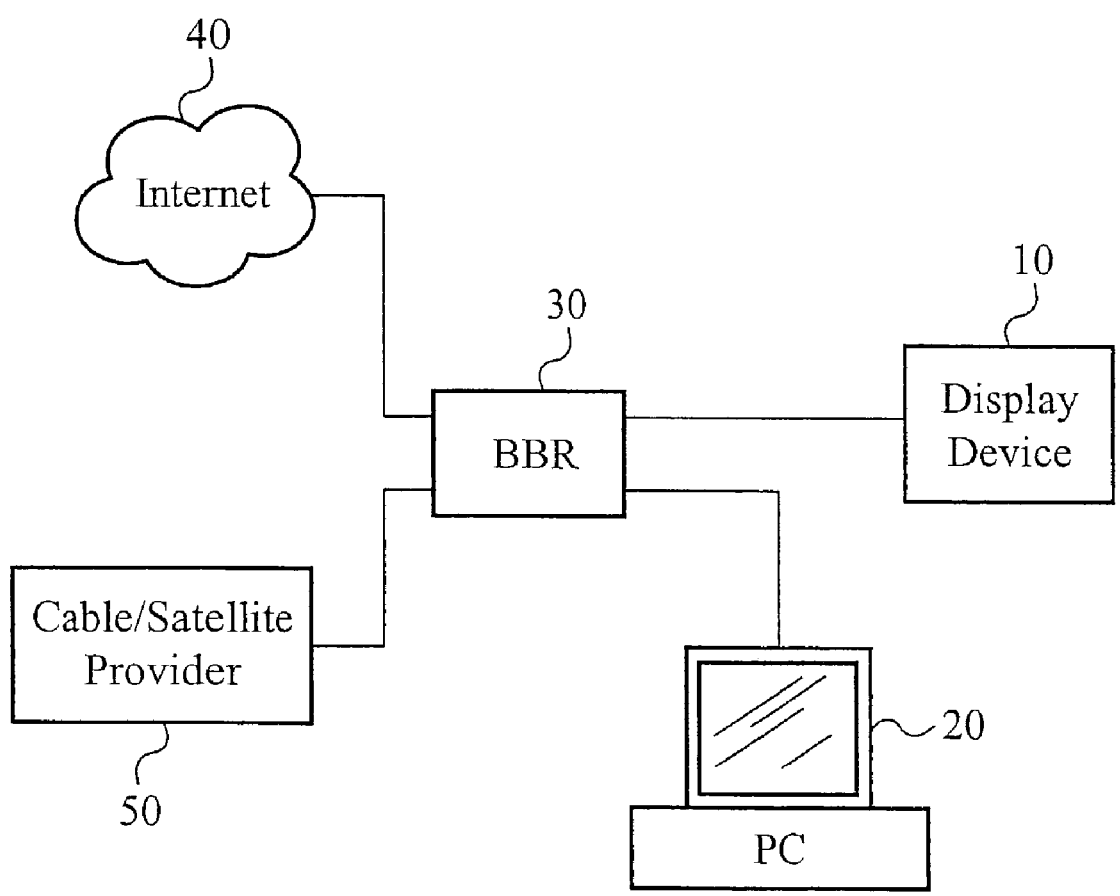
FIG. 1 illustrates an exemplary network of devices.

FIG. 1 illustrates an exemplary network of devices including a display device 10, a personal computer (PC) 20, and a broadband router (BBR) 30. The display device 10 preferably comprises a television with an embedded decoder device 110 (FIG. 2) which is discussed in greater detail below. In an alternative embodiment, the decoder device 110 comprises a stand alone device, such as a set top box, which is coupled to a display device, such as a television or the PC 20. In yet another alternative embodiment, the decoder device 110 is embedded within the PC 20. Preferably, the display device 10, the BBR 30 and the PC 20 comprise a home network.

The BBR 30 is preferably coupled to the Internet 40 via broadband, such as DSL or cable modem. The BBR 30 is preferably coupled to a cable service provider 50 via a conventional cable network and/or coupled to a satellite service provider 50 via a conventional satellite network. Alternatively, the display device 10 and/or the PC 20 are coupled directly to the Internet 40 and/or the cable/satellite service provider 50.

The configuration illustrated in FIG. 1 is exemplary only. It should be apparent that an audio/video network could include many different combinations of components. It should also be apparent that the home network can be of any conventional type, including but not limited to ethernet, IEEE 1394-2000, or wireless. Network connections external to the home network can be of any conventional type sufficient to provide a connection to a remote content source, including but not limited to the public switched telephone network, cable network, and satellite network.

Figure 2:
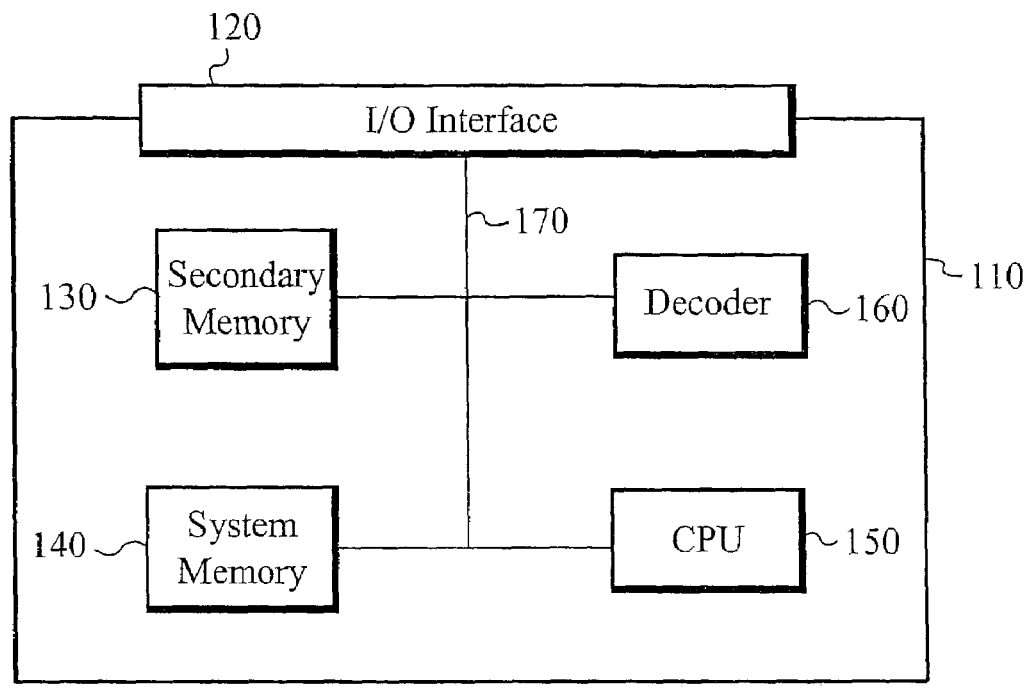
FIG. 2 illustrates a block diagram of an exemplary decoder device according to the present invention.

FIG. 2 illustrates an exemplary decoder device 110 according to the present invention. The decoder device 110 preferably controls the transmission of audio/video signals from a local storage device, such as a personal computer (PC), to a display or from a remote content provider, such as a cable/satellite television provider, to the display. The decoder device 110 includes an input/output (I/O) interface 120, a secondary memory 130, a system memory 140, a central processing unit (CPU) 150, and a decoder 160 all coupled via a bidirectional bus 170. The I/O interface 120 preferably couples the display device 10 to a content source (not shown) for receiving audio/video signals. The I/O interface 120 can also be coupled to a conventional network, such as the Internet, to receive periodic software upgrades including new versions of operating software and new or upgraded applications. In an alternative embodiment, the decoder device 110 includes a user interface. This alternative embodiment is commonly used when the decoder device is used as a stand-alone device. In the alternative embodiment, the I/O interface 120 can send and receive control signals to and from the user interface and the display device 10. The user interface can comprise a keypad and display, as is well known in the art. Alternatively, the user interface can comprise any conventional user interface.

The secondary memory 130 stores the software used to enable operation of the decoder device 110 along with a plurality of applications. Exemplary applications include, but are not limited to a menu of available content such as an on-screen television guide, and display parameter settings such as color, tint, and brightness. Preferably, the secondary memory 130 is flash memory. Alternatively, any conventional type of memory can be used. Preferably, the system memory 140 includes random access memory (RAM). The system memory 140 can also include additional buffers, registers, and cache according to specific design implementations. Audio/video signals received by the display device 10 are preferably encrypted to prevent unauthorized access and use, and the decoder 160 decrypts the audio/video signal according to access authorization provided by the CPU 150.

The decoder device 110 decodes the audio/video signal to obtain the closed captioning text, the time index, the positioning information, and the video data. The video data is appropriately scaled, and graphics are generated to form the talk bubbles and visual link to the speaker. The scaled video and the graphics are mixed and appropriately positioned on the display screen.

Figure 3:
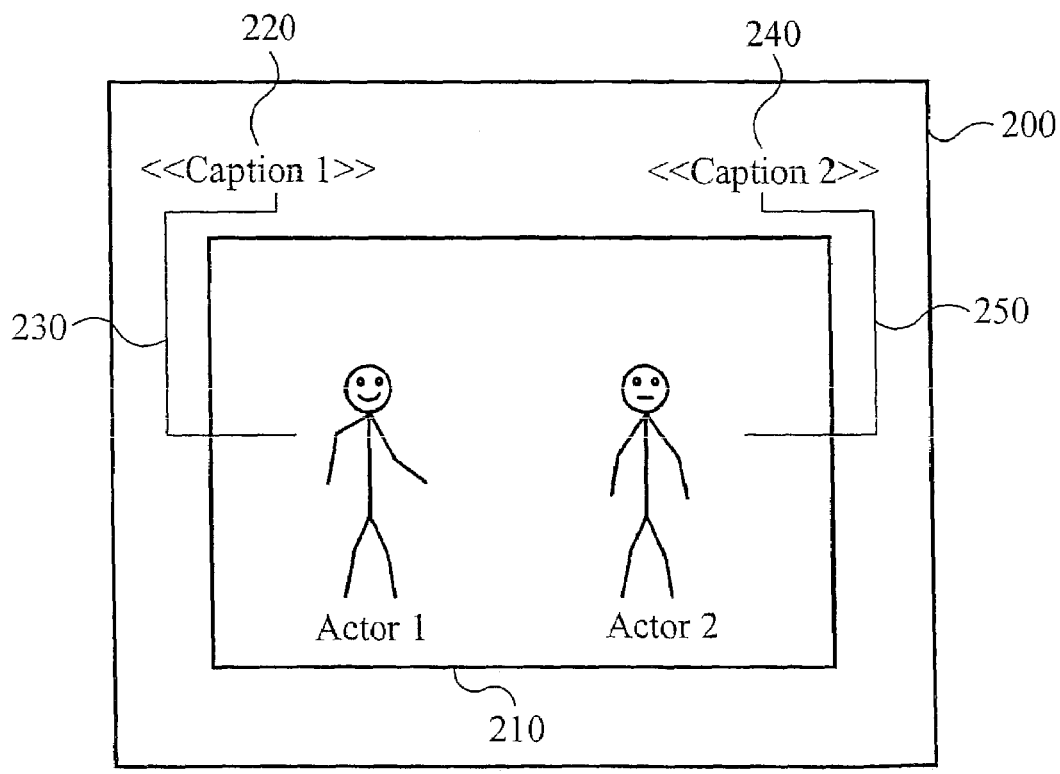
FIG. 3 illustrates an exemplary implementation of closed captioning according to the present invention.

FIG. 3 illustrates an exemplary implementation of closed captioning according to the present invention. The display device 10 (FIG. 1) includes a display screen 200 to display a scaled video 210, talk bubbles 220 and 240, and graphic links 230 and 250. The scaled video 210 includes actor 1 and actor 2. A closed captioning text, caption 1, associated with actor 1 is included within the talk bubble 220. The talk bubble 220 is visually linked to actor 1 via the graphic link 230. The talk bubble 220 is preferably positioned outside of the scaled video 210 and proximate actor 1. A portion of the graphic link 230 which is superimposed on the scaled video 210 is blended, preferably through the use of alpha blended graphics. A closed captioning text, caption 2, associated with actor 2 is included within the talk bubble 240. The talk bubble 240 is visually linked to actor 2 via the graphic link 250. The talk bubble 240 is preferably positioned outside of the scaled video 210 and proximate actor 2. A portion of the graphic link 250 which is superimposed on the scaled video 210 is blended, preferably using alpha blended graphics. In this manner, caption 1 and caption 2 do not block any of the scaled video 210. Also, the position of caption 1 proximate actor 1 and the position of caption 2 proximate actor 2 makes the dialog of actor 1 and actor 2 easier to follow. The graphic links 230 and 250 further enhance the ease with which caption 1 and caption 2 are associated with actor 1 and actor 2, respectively.

The closed captioning implementation illustrated in FIG. 3 demonstrates the preferred embodiment in which the video data is scaled and the closed captioning text is displayed off the scaled video. In an alternative embodiment, the video data is not scaled. In this alternative case, caption 1, caption 2, talk bubble 220, talk bubble 240, graphics link 230 and graphics link 250 are blended with the video data, preferably using alpha blended graphics. The caption 1, caption 2, talk bubble 220, talk bubble 240, graphic link 230, and graphic link 250 can remain positioned in the same locations as illustrated in FIG. 3, or the positions can be further refined to be more proximate actor 1 and actor 2 as appropriate. Since in the alternative embodiment it is not a concern that the talk bubble 220 and 240 do not overlay the video data, positioning the talk bubbles 220 and 240 closer to their respective speakers, actor 1 and actor 2, may be possible. Further, if the position of the talk bubble 220 and/or talk bubble 240 are within a predetermined distance of their associated speakers, then there may not be a need for either the graphics link 230 or the graphics link 250.

Figure 4:
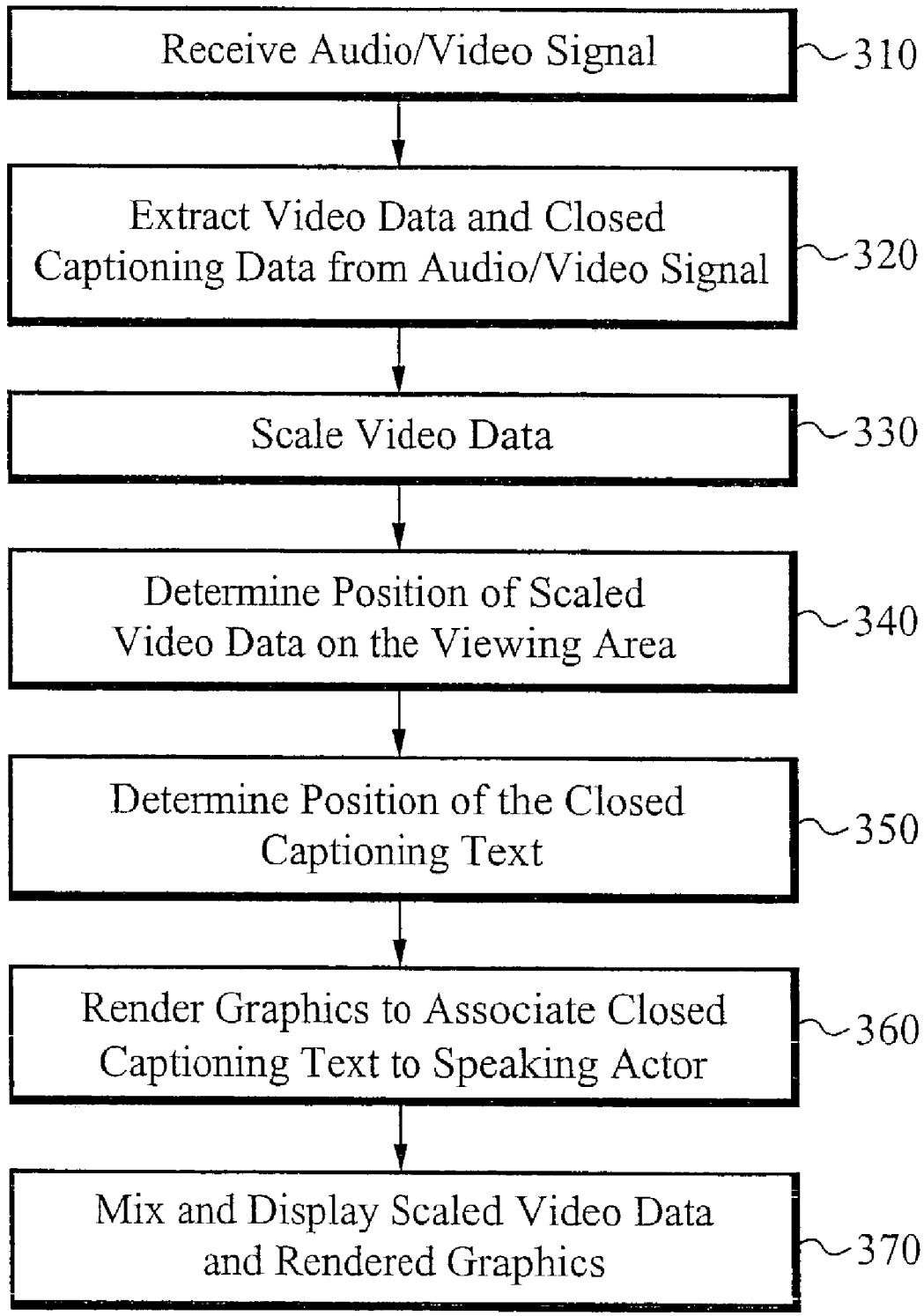
FIG. 4 illustrates a process of providing closed captioning according to the preferred embodiment of the present invention.

FIG. 4 illustrates a process of providing closed captioning according to the preferred embodiment of the present invention. At the step 310, an audio/video signal is received by a decoder device. At the step 320, the decoder device decodes and extracts video data and closed captioning data from the audio/video signal. The closed captioning data includes a closed captioning text, a timing index, and a positioning information. At the step 330, the video data is appropriately scaled to a size smaller than a full-screen size of a viewing area of a display. At the step 340, a position of the scaled video on the viewable area is determined. Preferably, the scaled video is centered within the viewable area. At the step 350, a position of the closed captioning text on the viewable area is determined. To determine the position of the closed captioning text, the extracted positioning information is used. The positioning information indicates a position within the video data, the position corresponds to a speaker who is speaking the corresponding closed captioning text at a given time index. The position within the video data is correlated to a position within the scaled video. A position for a talk bubble is then determined such that the talk bubble position is outside the scaled video yet proximate the associated speaker. The talk bubble includes the closed captioning text, thereby determining the position of the closed captioning text. At the step 360, graphics are rendered to associate the closed captioning text to the corresponding speaker within the scaled video. The graphics include the talk bubble and a graphics link which preferably extends from the talk bubble to the speaker. As such, the graphics link partially overlays the scaled video. The portion of the graphics link that partially overlays the scaled video is preferably blended using alpha blended graphics. At the step 370, the rendered graphics, the closed captioning text and the scaled video are mixed and displayed on the viewable area.

Although the scaled video is preferably centered within the viewable area, the position of the scaled video can be positioned to accommodate positioning the closed captioning text proximate the associated speaker and outside of the scaled video. Additionally, although the present invention is described in regards to decoding an audio/video signal, the present invention can also be applied to a video signal absent an audio component.

In operation, the closed captioning system of the present invention receives an audio/video signal that includes video data and closed captioning information. The audio/video signal, including video data and closed captioning information, can be received from any available source, including a broadcast source or a pre-recorded source, such as a video tape, DVD or CD-Rom type source. The video data is the video to be displayed and the closed captioning information includes closed captioning text, a timing index, and positioning information. The audio/video signal is decoded and the video data and the closed captioning information are extracted. Preferably, the video data is appropriately scaled to a size smaller than a full screen viewable area of a display. A position of the closed captioning text is determined outside the scaled video, using the positioning information provided by the audio/video signal. The positioning information includes coordinates of a speaker within the video data to which the closed captioning text corresponds. The timing index is used to properly correlate the closed captioning text and its positioning information to a specific portion of the video data. Using the coordinates of the speaker, the position of the closed captioning text is determined such that the closed captioning text is proximate the speaker yet outside the scaled video. A talk bubble graphic is rendered to surround the closed captioning text. Preferably, the entire talk bubble is outside the scaled video and an additional graphic, a graphic link, is added to visually link the talk bubble to the speaker. A portion of the graphic link overlays the scaled video. The graphic link is preferably a line, and the portion of the graphic link that overlays the scaled video is preferably blended with the scaled video. The closed captioning text, the rendered graphics and the scaled video are then mixed and displayed on the viewable area of the display.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, it will be apparent to one of ordinary skill in the art that while the preferred embodiment of the present invention is used with set-top boxes, the present invention can also be implemented on any other appropriate system resource limited device.

What is claimed is:

1. A method of closed captioning, the method comprising:
   a. receiving an audio/video signal including a video data and a closed captioning data;
   b. determining a position of a closed captioning text according to position information included within the closed captioning data, wherein the closed captioning text is associated to a speaker within the video data and the position of the closed captioning text is proximate the associated speaker;
   c. displaying the video data on a display screen and displaying the closed captioning text on the display screen according to the determined position; and
   d. rendering speaker-indicator graphics to provide a visual link between the closed captioning text displayed on the display screen and the associated speaker.

2. The method of claim 1 wherein the closed captioning text overlays the displayed video data.

3. The method of claim 2 wherein the closed captioning text is overlaid using alpha blended graphics.

4. The method of claim 1 further comprising mixing the rendered speaker-indicator graphics and the video data prior to display on the display screen.

5. The method of claim 1 wherein the closed captioning data further includes a timing index to associate the closed captioning text with a specific portion of the video data.

6. The method of claim 1 wherein the closed captioning data includes speaker position information that associates the closed captioning text to a position of the associated speaker within the video data.

7. A method of closed captioning, the method comprising:
   a. receiving an audio/video signal including a video data and a closed captioning data;
   b. determining a position of a closed captioning text according to position information included within the closed captioning data, wherein the closed captioning text is associated to a speaker within the video data and the position of the closed captioning text is proximate the associated speaker;
   c. displaying the video data on a display screen and displaying the closed captioning text on the display screen according to the determined position; and
   d. scaling the video data such that the scaled video data is smaller than the display screen on which the scaled video data is displayed.

8. The method of claim 7 wherein the position of the closed captioning text is outside of the scaled video data.

9. The method of claim 7 wherein the position of the closed captioning text partially overlays the scaled video data.

10. The method of claim 9 wherein the portion of the closed captioning text that overlays the scaled video data is overlaid using alpha blended graphics.

11. The method of claim 7 further comprising positioning the scaled video data on the display screen.

12. A method of closed captioning, the method comprising:
   a. receiving an audio/video signal including a video data and a closed captioning data;
   b. scaling the video data such that the scaled video data is smaller than a display screen on which the scaled video data is displayed;
   c. positioning a closed captioning text according to position information included within the closed captioning data, wherein the closed captioning text is associated to a speaker within the displayed scaled video data and the position of the closed captioning text is proximate the associated speaker.

13. The method of claim 12 wherein the position of the closed captioning text is outside of the scaled video data.

14. The method of claim 12 wherein the position of the closed captioning text partially overlays the scaled video data.

15. The method of claim 14 wherein the portion of the closed captioning text that overlays the scaled video data is overlaid using alpha blended graphics.

16. The method of claim 12 further comprising positioning the scaled video data on the display screen.

17. The method of claim 12 further comprising rendering speaker-indicator graphics to provide a visual link between the closed captioning text displayed on the display screen and the associated speaker.

18. The method of claim 17 further comprising mixing the rendered speaker-indicator graphics and the scaled video data prior to display on the display screen.

19. The method of claim 12 wherein the closed captioning data further includes a timing index to associate the closed captioning text with a specific portion of the video data.

20. The method of claim 12 wherein the closed captioning data includes speaker position information that associates the closed captioning text to a position of the associated speaker within the video data.

21. A device to provide closed captioning, the device comprising:
   a. an input/output (I/O) interface circuit to receive an audio/video signal, the audio/video signal including a video data and a closed captioning data;
   b. a display including a viewable area; and
   c. a processing circuit coupled to the display and to the I/O interface circuit to receive the audio/video signal from the I/O interface circuit, scale the video data such that the scaled video data is smaller than the viewable area, and position a closed captioning text according to position information included within the closed captioning data, wherein the scaled video data is displayed on a portion of the viewable area, thereby forming a displayed video data, the closed captioning text is associated to a speaker within the displayed video data and the position of the closed captioning text on the viewable area is proximate the associated speaker.

22. The device of claim 21 wherein the device comprises an interactive television.

23. The device of claim 21 wherein the closed captioning data includes speaker position information that associates the closed captioning text to a position of the associated speaker within the video data.

24. The device of claim 21 further comprising a decoder to decode the received audio/video signal.

25. The device of claim 21 wherein the position of the closed captioning text is outside of the scaled video data.

26. The device of claim 21 wherein the position of the closed captioning text partially overlays the scaled video data.

27. The device of claim 26 wherein the portion of the closed captioning text that overlays the scaled video data is overlaid using alpha blended graphics.

28. The device of claim 21 wherein the processor renders speaker-indicator graphics to provide a visual link between the closed captioning text displayed on the viewable area and the associated speaker.

29. The device of claim 28 wherein the processor mixes the rendered speaker-indicator graphics and the scaled video data prior to display on the viewable area.

30. The device of claim 21 wherein the closed captioning data further includes a timing index to associate the closed captioning text with a specific portion of the video data.

31. A television to provide closed captioning, the television comprising:
   a. an input/output (I/O) interface circuit to receive an audio/video signal, the audio/video signal including a video data and a closed captioning data;
   b. a display including a viewable area; and
   c. a processing circuit coupled to the display and to the I/O interface circuit to receive the audio/video signal from the I/O interface circuit, scale the video data such that the scaled video data is smaller than the viewable area, and position a closed captioning text according to position information included within the closed captioning data, wherein the scaled video data is displayed on a portion of the viewable area, thereby forming a displayed video data, the closed captioning text is associated to a speaker within the displayed video data and the position of the closed captioning text on the viewable area is proximate the associated speaker.

32. The television of claim 31 wherein the device comprises an interactive television.

33. The television of claim 31 wherein the closed captioning data includes speaker position information that associates the closed captioning text to a position of the associated speaker within the video data.

34. The television of claim 31 further comprising a decoder to decode the received audio/video signal.

35. The television of claim 31 wherein the position of the closed captioning text is outside of the scaled video data.

36. The television of claim 31 wherein the position of the closed captioning text partially overlays the scaled video data.

37. The television of claim 36 wherein the portion of the closed captioning text that overlays the scaled video data is overlaid using alpha blended graphics.

38. The television of claim 31 wherein the processor renders speaker-indicator graphics to provide a visual link between the closed captioning text displayed on the viewable area and the associated speaker.

39. The television of claim 38 wherein the processor mixes the rendered speaker-indicator graphics and the scaled video data prior to display on the viewable area.

40. The television of claim 31 wherein the closed captioning data further includes a timing index to associate the closed captioning text with a specific portion of the video data.

41. A network of devices to provide closed captioning, the device comprising:
   a. a display device including a viewable area; and
   b. a decoder comprising an input/output (I/O) interface circuit to receive an audio/video signal, the audio/video signal including a video data and a closed captioning data, and a processing circuit coupled to the I/O interface circuit to receive the audio/video signal, scale the video data such that the scaled video data is smaller than the viewable area, and position a closed captioning text on the viewable area according to position information included within the closed captioning data, wherein the scaled video data is sent to the display device to be displayed on a portion of the viewable area, thereby forming a displayed video data, the closed captioning text is associated to a speaker within the displayed video data and the position of the closed captioning text on the viewable area is proximate the associated speaker.

42. The network of devices of claim 41 wherein the display device comprises an interactive television.

43. The network of devices of claim 41 wherein the decoder comprises a set top box.

44. The network of devices of claim 41 wherein the closed captioning data includes speaker position information that associates the closed captioning text to a position of the associated speaker within the video data.

45. The network of devices of claim 41 wherein the decoder further comprises a decoder circuit to decode the received audio/video signal.

46. The network of devices of claim 41 wherein the position of the closed captioning text is outside of the scaled video data.

47. The network of devices of claim 41 wherein the position of the closed captioning text partially overlays the scaled video data.

48. The network of devices of claim 47 wherein a portion of the closed captioning text that overlays the scaled video data is overlaid using alpha blended graphics.

49. The network of devices of claim 41 wherein the processor renders speaker-indicator graphics to provide a visual link between the closed captioning text displayed on the viewable area and the associated speaker.

50. The network of devices of claim 49 wherein the processor mixes the rendered speaker-indicator graphics and the scaled video data prior to display on the viewable area.

51. The network of devices of claim 41 wherein the closed captioning data further includes a timing index to associate the closed captioning text with a specific portion of the video data.

52. An apparatus to provide closed captioning, the apparatus comprising:
   a. means for receiving an audio/video signal including a video data and a closed captioning data;
   b. means for positioning a closed captioning text according to position information included within the closed captioning data, wherein the closed captioning text is associated to a speaker within the video data and the position of the closed captioning text is proximate the associated speaker; and
   c. means for rendering speaker-indicator graphics to provide a visual link between the closed captioning text displayed on a display screen and the associated speaker.

53. The apparatus of claim 52 wherein the closed captioning text overlays the displayed video data.

54. The apparatus of claim 53 wherein the closed captioning text is overlaid using alpha blended graphics.

55. The apparatus of claim 52 further comprising means for mixing the rendered speaker-indicator graphics and the video data prior to display on the display screen.

56. The apparatus of claim 52 wherein the closed captioning data further includes a timing index to associate the closed captioning text with a specific portion of the video data.

57. The apparatus of claim 52 wherein the closed captioning data includes speaker position information that associates the closed captioning text to a position of the associated speaker within the video data.

58. An apparatus to provide closed captioning, the apparatus comprising:
   a. means for receiving an audio/video signal including a video data and a closed captioning data;

b. means for positioning a closed captioning text according to position information included within the closed captioning data, wherein the closed captioning text is associated to a speaker within the video data and the position of the closed captioning text is proximate the associated speaker; and c. means for scaling the video data such that the scaled video data is smaller than a display screen on which the scaled video data is displayed.

59. The apparatus of claim 58 wherein the position of the closed captioning text is outside of the scaled video data.

60. The apparatus of claim 58 wherein the position of the closed captioning text partially overlays the scaled video data.

61. The apparatus of claim 60 wherein the portion of the closed captioning text that overlays the scaled video data is overlaid using alpha blended graphics.

62. The apparatus of claim 58 further comprising means for positioning the scaled video data on the display screen.

* * * * *

UNITED STATES PATENT AND TRADEMARK OFFICE
CERTIFICATE OF CORRECTION

| | | |
|---|---|---|
| PATENT NO. | : 7,106,381 B2 | Page 1 of 1 |
| APPLICATION NO. | : 10/396766 | |
| DATED | : September 12, 2006 | |
| INVENTOR(S) | : Donald Molaro and Ted M. Dunn | |

It is certified that error appears in the above-identified patent and that said Letters Patent is hereby corrected as shown below:

IN THE CLAIMS

Col. 12, lines 49 and 50, replace "The apparatus of claim 52 wherein the closed captioning text overlays the displayed video data." with --The apparatus of claim 52 wherein the closed captioning text overlays the video data.--

Col. 13, line 4, replace "to a speaker within the video data" with --to a speaker within the displayed scaled video data--.

Signed and Sealed this

Twelfth Day of December, 2006

JON W. DUDAS
*Director of the United States Patent and Trademark Office*